United States Patent Office 2,756,207
Patented July 24, 1956

2,756,207
SEA WATER HEATING

Bernard A. Axelrad, Freeport, Tex., assignor to Freeport Sulphur Company, New York, N. Y., a corporation of Delaware No Drawing. Application September 4, 1951,
Serial No. 245,090

9 Claims. (Cl. 210—14)

This invention relates to a process for heating sea and other saline waters to high temperatures and more particularly to the heating of such waters in indirect heat exchangers to temperatures of at least 250° F. without causing the usual high rate of deposition of hard scale on the surfaces of the heating equipment.

If sea water is heated to such high temperatures under ordinary indirect heat exchange practice, salts therein rapidly precipitate out and form a hard scale which reduces the heat transfer efficiency and soon require that the equipment be taken out of use, opened up and scraped or turbined to remove the scale.

The ultimate object of the invention is to provide large quantities of very hot salt water at low cost. An intermediate object is to heat such water in indirect heat exchange equipment by a procedure which avoids a prohibitive rate of deposition of salts on the hot heating surfaces of the equipment.

A specific object of the invention is to cause scale-forming compounds including magnesium hydroxide and calcium carbonate which separate out from the salt water during the heating operation, to deposit for the most part in the form of a soft, non-adherent layer primarily in the lower temperature portion of a multi-stage indirect heating tube. This soft sludge may therefore be removed from the heating tubes with a minimum of disturbance in, and delay in the use of, the heating equipment, and a substantially continuous stream of hot water can be maintained.

In its primary embodiment, the invention involves heating salt water containing the usual calcium sulfate and other scale-forming compounds to temperatures above 250° F. in a two stage indirect heat exchanger and controlling the heat transfer in the first stage such that scale-forming compounds in the water which separate out will deposit primarily or substantially only in the form of a soft, non-adherent layer in the first stage and controlling the heating in the second stage such that the thus obtained water can be and is heated to a higher temperature without causing deposition of appreciable amounts of hard scale on the heating surfaces of said stage.

In the two stage indirect heat exchanger the water is forced under superatmospheric pressure into the tube or bank of tubes constituting the first stage and is heated therein to a temperature at which scale-forming compounds in the water deposit substantially only as a soft, non-adherent layer by applying heat to the water from the heat exchange surfaces at a temperature predetermined to be below that at which the scale-forming compounds present in the water of the specific salinity treated will deposit as a hard adherent scale during the period the water is present in said stage. Next, the altered hot water thus obtained is flowed under the pressure through the tube or tubes of the second stage of the heat exchanger and therein heated to a higher temperature but below that predetermined to cause the calcium sulfate present to precipitate out in such stage during the period the water is present in said stage, by applying heat to the water from the heat exchanger surfaces maintained at temperatures predetermined to be below those at which calcium sulfate present in the altered hot water being heated will form a scale at a prohibitive rate during the period the water is present in said stage. Finally, the heated water is flowed from the said second stage before calcium sulfate precipitation has occurred. To maintain acceptable heat transfer rates, the soft layer deposited is periodically removed by forcing a fluid at high velocity through the tube.

The invention may be utilized for heating any natural salt water, marsh water, bay water, tidal water and other like natural waters containing a salinity (total solids content) of at least about two hundred grains per gallon (G. P. G.), and it is particularly applicable to the treatment of brackish waters or sea water of intermediate salinity, as those having a total salinity of from about 600 to 1700 G. P. G. All of such waters invariably contain in addition to the sodium chloride various scale-forming salts principally calcium sulfate, magnesium salts, calcium carbonate, and minor amounts of other compounds.

These salts can be removed or altered by known procedures for example ion exchange and distillation such that the water containing the same can be heated to high temperatures without causing scale formation, but such processes are too expensive for use in providing large quantities of hot water required for a number of industrial purposes.

The heating of the salt water in accordance with the process of the present invention is accomplished by the following series of steps and controls.

The salt water is first pumped into the tubes of a two stage heat exchanger under superatmospheric pressure of a magnitude sufficient to provide a pressure at the exchanger outlet greater than the vapor pressure of the water and preferably also above that of the dissolved gases. The initial pressure applied varies with the ultimate temperature, the particular construction of the exchanger and other minor factors. Pressures of 250–350 p. s. i. are suggested minimums, for contemplated embodiments.

The ultimate temperature to which the water is heated may depend upon the use to which the heated water is to be put, but the maximum temperature possible is determined to a large extent by the salinity of the water being heated and the success of the first step in removing scale-forming compounds. The greater the salinity, the lower the maximum temperature possible. Heating to excessive ultimate temperatures leads to unavoidable precipitation and deposition of hard calcium sulfate scale. By limiting the ultimate temperature to a level below that at which the precipitation takes place from the hot water from which some of the scale-forming compounds have been removed, such scale deposition can be substantially avoided.

The ultimate possible maximum temperature to which a salt water of any specific salinity can be successfully heated is influenced to some extent by the particular heat exchanger construction or system employed, the velocity of the water travelling through the tubes and the skin temperature of the heating surfaces. In actual operations, if salt water is desired at the maximum possible temperature, such temperature must be determined by trial and error in the specific exchanger to be used. As a general guide to possible maximum temperatures at various salinities the following table is given by way of example:

| Salinity of Sea Water | Maximum Allowable Temperature Obtained by Indirect Heating, °F. |
|---|---|
| Chlorides as grains per gal. sodium chloride: | |
| Less than 1,000 | 340 |
| 1,000 to 1,300 | 335 |
| 1,300 to 1,600 | 325 |
| 1,600 to 1,800 | 320 |
| Above 1,800 | 315 |

This limitation as to the ultimate possible maximum temperature is coupled with the equally important requirements as to the manner of effecting the heating of the salt water in the heat exchanger tubes. It has now been discovered, that if deposition of hard scale in the tubes is to be avoided, not only must the ultimate temperature of the water be restricted, but also the skin temperature of the heating surfaces with which the water comes in contact must be limited. Heating of sea water to temperatures above 250° F. in heat exchangers in any number of steps (one or more), utilizing conventional efficient heat exchange practice invariably leads to hard scale deposition.

In the instant process, the heating of the salt water in both stages must be controlled in such manner that the skin temperature or temperatures of the heating surface with which the water comes in contact are always below the temperature predetermined to cause hard scale formation from water of the specific salinity treated during the period the water remains in the tubes.

In the two stage heating of the salt water, the amount of temperature increase is divided such that the deposition of a soft layer of salts and hydroxides occurs substantially only in the first stage. This result may generally be accomplished by heating to a final temperature of from 290° F. to 330° F. (preferably 300° F.) in the first stage, depending principally upon the salinity of the water. The period of heating in the first stage should generally be from 2 to 8 times that of the second stage. Since the tendency of the calcium sulfate to form scale is much greater at higher temperatures, the time during which the water is maintained in the second stage or at its highest temperature range must be limited and preferably is kept at a minimum commensurate with efficient operation.

In accomplishing the operation in two stages, the heating may be effectively carried out by the use of steam at different pressures in the respective stages, as up to seventy pounds in the first stage and above seventy in the second stage depending upon the salinity and other factors hereinbefore mentioned. It appears that the removal of scale-forming compounds by deposition in the first stage permits a higher skin temperature to be used in the second stage without causing hard scale deposition in the second stage.

If it is not desired to heat the salt water to the maximum temperature possible or to a temperature approaching said maximum, without causing hard scale deposition, it is not essential that higher pressure steam be employed in the second stage. Under this mode of operation, the additional time the salt water is in the tube in the second stage brings about the heating to the higher ultimate temperature.

During the continuance of the heating operation in the heat exchanger, it is necessary for efficient operation to alter the controls as the deposit builds up in the tubes in order to maintain the desired final temperature constant.

Where steam at variable pressure is available, the preferred procedure involves maintaining a constant water velocity in the exchanger tubes and gradually increasing the steam pressure on the respective heating stages to compensate for the reduction in heat transfer rate resulting from the soft layer or scale formation. By increasing the steam pressure gradually, an excessive increase in the skin temperature of the water being heated is avoided. When the steam pressures on the respective heating stages reach values previously established as the desired maximum from operating data, the heat exchanger tubes are cut out and flushed after which the steam pressure is reapplied at the initial minimum value and the process is repeated. The steam pressure on each stage may be conveniently regulated automatically by suitable instruments to maintain the salt water leaving the respective heating stage at a specified temperature.

Operation of several different heat exchangers in accordance with the present invention appears to indicate that the preferred velocity of the salt water in the heat exchangers is 5 to 9.5 feet per second, but velocities in the range of 4 to 12 feet per second could be used if the exchanger were designed consistent with the heat loads and temperature differentials present at the preferred range.

In an alternative system the steam pressure on each stage is maintained at a desired value and the water velocity in each individual tube is adjusted through certain limits and lessened to maintain the desired temperature of the salt water, and the flushing operation is carried out periodically to restore initial heat transfer rates. In this mode of operation the water volume is gradually reduced as the deposit forms thereby holding the water temperature substantially constant. Since the preferred apparatus involves a number of parallel streams of water passing through individual exchanger tubes, the regulation of the total water load on the plant can be accomplished in such a way that the combined water output is not materially changed.

Since the heating process of the instant invention depends upon the water velocity, temperature and temperature gradients, the invention contemplates in its broadest scope, systems of regulation other than those set forth above including combinations of the two systems hereinbefore described.

Upon completion of the heating operation the hot water obtained may be utilized for its intended purpose at the pressure it is obtained or its pressure may be reduced commensurate with its temperature to any extent desired.

After a period of operation, normally between one and four days, the water is shut off from the tubes and the soft layer is flushed out.

This flushing may be accomplished by cutting out the sea water supply, opening a valve to waste at one end of the heat exchanger and admitting steam at the other end until the exhaust is free of suspended matter. It has been found that three successive blows of one minute, thirty seconds, and thirty seconds, with the steam pressure allowed to build up to a convenient head of pressure of about 65 p. s. i. prior to each break, is effective in removing the said deposits. The flushing may alternatively be accomplished by the use of other fluids such as high velocity air or water. Regardless of the fluid used, the flushing can be accomplished in a very short time and the tube replaced in service. For greater efficiency of operation the heat exchanger should contain a bank of tubes of ten or more. With this provision, the flushing of the individual tubes can be accomplished without interrupting or altering the continuous, constant flow of the hot water, provided the exchangers are so designed and arranged that any single tube can be easily cut out of the heating circuit and flushed to remove the soft deposits without interfering with the operation of the other tubes.

In the first stage tube or tubes the soft deposits are composed principally of magnesium hydroxide and calcium carbonate combined with silica, iron, aluminum oxides and similar material from the raw salt water. Slight amounts of these compounds unavoidably deposit as a hard adherent scale, the amount formed in both stages depending upon the salinity of the water and the specific control employed as to the temperature to which the water is heated. With salt water of low salinity the rate of soft sludge deposition is relatively rapid as compared with the rate of hard scale deposition, but when salinities above 1500 G. P. G. to 1800 G. P. G. are treated the rate of soft sludge deposition decreases and the rate of hard scale formation increases. The composition of the soft sludge and hard scale is similar for the same water, but at low salinity magnesium hydroxide is the main constituent whereas at high salinities calcium carbonate is the principal constituent of the deposits.

Since the flushing operation does not remove hard scale there is a gradual build up of this scale which leads to a general decline in the heat transfer rate. The infrequent necessity for removing the hard scale is not prohibitive to commercial operations particularly when the brackish water is being heated at temperatures up to about 350° F., since the scale is substantially free of hard, tenacious, chemically-resistant calcium sulfate.

In accordance with a special embodiment of the invention the ultimate temperature to which the brackish water may be heated without prohibitive hard scale formation is increased by the addition of sodium chloride to the said water prior to the heating operation. The amount of additional salt needed will depend on both the salinity of the sea water and upon the maximum temperature to which the water is to be heated. Although the salt to be added may be obtained from any suitable source, the instant invention contemplates obtaining such salt from wells drilled into the relatively pure sodium chloride formations always found beneath the sulfur bearing caprock of salt dome structures and saturating a small part of the brackish water requirements by pumping the same into and out of the salt well in the standard manner for obtaining saturated brines. This minor percentage of sea water thus saturated with sodium chloride is then mixed with the major current of sea water prior to heating.

In carrying out the process of the present invention it may be advantageous in the treatment of some sea water to employ a stabilizing agent for obtaining better control of scale deposition in the heat exchanger. Any of the several compounds known to inhibit or minimize scale deposition in water heating systems may be employed, for example, any of the group known as glassy phosphates.

The operability of the process of the present invention was determined and demonstrated to be successful by operation in various heat exchanger setups including a forty to fifty-five gallon per minute pilot plant corresponding to a single stream in a commercial plant. The essential part of the plant consisted of five stages of indirect heat exchangers of standard commercial design connected in series. The water velocities ranged principally from six to nine feet per second. Tests were conducted over a wide salinity range with concentration upon salinities of 700 to 1960 grains per gallon and rates between 44 and 56 gallons per minute. At 40 gallons per minute flow, an initial pressure of 250 p. s. i. was frequently employed leading to an outlet pressure of 155 p. s. i. At 50 gallons per minute flow, an inlet pressure of 310 p. s. i. led to an outlet pressure of 161 p. s. i.

*Example 1*

A natural brackish water of 700 G. P. G. salinity was forced under superatmospheric pressure into and through a heat exchanger system composed of five tubular heaters each 160 feet long, connected in series, the rate of flow being 45 G. P. M. and its velocity being 7.1 ft./sec. The heat was applied to the tubes by transfer from steam and the temperature conditions in the five steps were as set forth in the following table:

| Temperatures | No. 1 | No. 2 | No. 3 | No. 4 | No. 5 |
|---|---|---|---|---|---|
| Water Inlet, °F | 50 | 262 | 289 | 316 | 329 |
| Water Outlet, °F | 262 | 289 | 316 | 329 | 345 |
| Avg. Steam Temp., °F | 273 | 290 | 330 | 335 | 347 |

During the operation the water skin temperatures were maintained substantially constant by gradually increasing the steam temperatures to compensate for the gradually increasing deposit of a soft layer mostly of magnesium hydroxide, said deposition taking place for the most part in the intermediate tubes of the series. The actual water skin temperatures are lower than the steam temperatures and cannot be measured accurately, but such temperatures were maintained below the approximate figures given in the following table:

| Heater No. | 1 | 2 | 3 | 4 | 5 |
|---|---|---|---|---|---|
| Max. Water Skin Temp., °F | 270 | 290 | 320 | 330 | 350 |

The heating of the water was continued for a period of eight days (on-stream-181 hours or 94+%), the heater being flushed at twenty-four hour intervals using 65 p. s. i. steam at a rate of 1500 pounds per hour for one minute followed by two thirty second blows.

The successful prevention of hard calcium sulfate scale deposition in the process is indicated by the comparative analyses of the following table:

| Water Analysis—Avg. | Raw Water | Heated Water |
|---|---|---|
| Salt (NaCl) | 665 G. P. G. | 665 G. P. M. |
| Ca | 270 P. P. M. | 270 P. P. M. |
| Mg | 488 P. P. M. | 485 P. P. M. |
| SO4 | 1,005 P. P. M. | 1,005 P. P. M. |

*Example 2*

A natural salt water of 1295 G. P. G. salinity was forced under superatmospheric pressure into and through the heat exchange equipment defined in Example 1 at the same rate and at the same velocity. The heating conditions or temperatures are set forth in the following table:

| Temperatures, °F. | 1 | 2 | 3 | 4 | 5 |
|---|---|---|---|---|---|
| Water Inlet | 85 | 225 | 262 | 289 | 315 |
| Water Outlet | 225 | 262 | 289 | 315 | 332 |
| Avg. Steam Temp | 237 | 265 | 291 | 320 | 336 |
| Max. Water Skin Temp | <235 | <265 | <291 | <320 | <335 |

The duration of the test was twenty days. The tubes were flushed at intervals of two to three days, the maximum formation of the soft layer taking place in heater number 3. The operation was on stream 96 ½% of the time.

From the following table it will be observed again that the amount of calcium sulfate deposited in the tubes was inconsequential. The separated magnesium content deposited in the form of soft magnesium hydroxide.

| Water Analysis | Salt, G. P. G. | Ca, P. P. M. | Mg, P. P. M. | SO4, P. P. M. |
|---|---|---|---|---|
| Raw Water | 1,295 | 305 | 937 | 1,899 |
| Heated Water | 1,295 | 305 | 930 | 1,899 |

*Example 3*

A natural sea water of high salinity of 1960 G. P. G. was forced into the equipment described in Example 1, except that only four steps were employed, at a pressure of about 275 pounds per square inch, at the same average rate and velocity. The temperature conditions maintained are recorded in the following table:

| Temperature, °F. | 1 | 2 | 3 | 4 |
|---|---|---|---|---|
| Water Inlet | 85 | 225 | 262 | 289 |
| Water Outlet | 225 | 262 | 289 | 316 |
| Avg. Steam Temp | 245 | 286 | 305 | 325 |
| Max. Water Skin Temp | 230 | 270 | <292 | <321 |

The hot water leaving the fourth heater was at a pressure of about 160 pounds per square inch. The tubes were flushed at twenty-four hour intervals to remove the soft deposits during the run which lasted for 17½ days. At the end of this time the maximum thickness of hard scale in any of the heater tubes was only .06 inches and only 4 to 6% of the same was composed of calcium sulfate.

To indicate the criticality of the temperature controls, the hot water leaving heater number 4 at 316° F. was passed through heater number 5 where it was heated to 342° F. In the section of the heater where the water had reached 325° F. a substantially increased rate of hard scale formation was observed, the same being ten times as fast as that which occurred in heater number 4 at 316 °F. This hard scale contained 52.3% calcium sulfate. At the outlet from the fifth heater where the temperature was 342° F. the hard scale formed at a rate about three times as fast as that which formed at the temperature of 325° F. and such scale contained 91.4% calcium sulfate. It was therefore evident that the water skin temperature, estimated as being at about 345° F., was too high for successful heating of the water being treated.

*Example 4*

A run similar to that described in Example 3 except that water rates and velocities were increased by 25% was carried out, the initial pressure being 350 pounds per square inch in the inlet and 175 pounds per square inch in the outlet from the last heater. To obtain the same ultimate temperature of the water, higher steam temperatures were employed in the respective heaters. The water skin temperatures were estimated as being about 15 to 20% higher than those given in the table set out in Example 3. Although the process would be considered operable inasmuch as the amount of hard scale was not prohibitive, the higher water skin temperatures resulted in the formation of a greater amount of hard scale from the soft flushable scale. This run made it clear that for optimum results it was necessary to operate at somewhat lower temperatures by accepting lower water temperatures or by providing more heat transfer area.

*Example 5*

A run was carried out similar to that described in Example 2 except that water having a salinity of 1000 G. P. G. was used. Comparable results were obtained, however, only when the heaters were flushed at twenty-four hour intervals rather than at intervals of two to three days as employed in the run of Example 2. Investigation revealed that the particular water treated in this latest run formed heavy gel-like silica deposits, which, however, could be flushed out provided the temperatures were controlled in accordance with the practice of the present invention or as set forth in the following table:

| Heater | No. 1 | No. 2 | No. 3 | No. 4 | No. 5 |
|---|---|---|---|---|---|
| Water Outlet, °F | 225 | 262 | 289 | 315 | 332 |
| Water Skin Temp., °F | 235 | 265 | 292 | 318 | 335 |

In this run, the hard scale formed was less than that in Example 2 although the same water temperatures and skin temperatures were employed, the lesser amount being due to the lower salinity of the water treated.

This last run makes it evident that to obtain optimum operating conditions with any untried or new source of salt water, simple tests must be run in the equipment to determine the optimum skin temperatures which minimize formation of hard scale or the baking on of soft scale in the lower temperature tube or tubes and to determine conditions for minimum sulfate scale formation and to determine optimum flushing intervals.

Before the salt water is introduced in the indirect heat exchanger for heating at temperatures normally causing hard scale deposition, the water may be preheated by any method desired as by direct heat transfer using combustion gases in a tower or by submerged combustion or both, the temperature of this preheating being limited preferably to a final temperature of about 180-190° F.

In referring to the heating of the water in two stages herein, it should be understood that the operation may be accomplished in any number of steps and each stage can consist of two or more steps. Regardless of the number of steps employed, the first stage is that during which the salt water is heated up to and including that at which the scale-forming compounds deposit as a soft, non-adherent layer in the tubes, and the second stage is that during which the water from which the soft sludge has been removed is heated to the final or ultimate temperature in which very little or no deposition of scale takes place.

It should be understood that the present invention is not limited to the specific details hereinbefore set out, but that it extends to all equivalents which will occur to those skilled in the art upon consideration of the terms and scope of the claims appended hereto.

I claim:

1. A process for heating sea water containing calcium sulfate and other scale forming compounds to temperatures above 250° F. in a two stage indirect heat exchanger and of causing the scale-forming compounds in said water which separate out on heating to such temperature to deposit primarily in the form of a soft non-adherent layer in the first stage, which comprises forcing said water under superatmospheric pressure in a stream into a tube of the first stage of the two stage heat exchanger, passing the water under the pressure through the said tube, heating the water while in said tube to a temperature at which scale-forming compounds in the water deposit substantially only as a soft, non-adherent layer by applying heat to the water from the heat exchanger surfaces at a temperature below that at which the scale-forming compounds present in the water of the specific salinity treated will deposit as a hard adherent scale during the period the water is present in said stage, thereafter flowing the thus altered hot water into and through the second stage of the heat exchanger under the pressure, heating said water in said second stage to a higher temperature but below that which causes the calcium sulfate present to precipitate out in said stage during the period the water is present in said stage by applying heat to the water from the heat exchanger surfaces maintained at temperatures below those at which the calcium sulfate present in the altered hot water being heated will form a scale at a prohibitive rate during the period the water is present in said stage, flowing the thus heated water from the said stage before the said precipitation has occurred and periodically flushing the soft layer from the tube of the first stage by forcing a fluid at high velocity through said tube, whereby said tube is restored substantially to its initial heat transfer rate and capacity.

2. A process for heating brackish water containing calcium sulfate and other scale-forming compounds to temperatures above 250° F. in a stream flowing through an indirect heat exchanger and of causing the scale-forming salts in said water which separate out to deposit primarily in the form of a readily removable, soft, non-adherent layer which comprises forcing said water under superatmospheric pressure into and through a two stage tube heat exchanger, passing the water under such pressure through the tubes of the first stage of the exchanger, heating the water in said first stage to a temperature at which scale-forming salts in the water form a deposit composed substantially only of a soft, non-adherent layer by applying heat to the water from the heat exchange surfaces at a temperature below that at which the scale-forming salts present in the water of the specific salinity treated will form a hard, adherent scale during the period the water is present in said stage, thereafter heating the thus altered hot water in the second stage under such pressure to a higher temperature but below that at which the calcium sulfate precipitates out in said stage by applying to the water from the heat exchanger surfaces maintained at temperatures below that at which the calcium sulfate present in the altered hot water being heated will form a hard adherent scale during the period that water is present in said stage, removing the water from the said stage before the said precipitation has occurred and periodically flushing the soft sludge from the heating surfaces by forcing a fluid rapidly over the surfaces on which the sludge is deposited.

3. A process for increasing the temperature to which sea water can be heated in indirect heat exchanger tubes without causing prohibitive deposition of compounds in said tubes in the form of a hard, adherent scale which comprises, passing the sea water through the tubes under a superatmospheric pressure, maintaining the sea water side of the tubes at a temperature above 250° F. at which scale-forming salts in the sea water deposit substantially only in the form of a soft, non-adherent sludge, and heating the sea water during the time it is in said tubes under superatmospheric pressure to an ultimate temperature above 250° F. at which calcium sulfate would in the absence of steps to prevent the same form a hard scale but below that at which the calcium sulfate in the sea water forms a hard scale during the period the sea water is in the tubes, thereby obtaining sea water at said higher temperature and without forming excessive hard scale in the tubes.

4. A process for heating brackish water containing calcium sulfate and other scale-forming salts to temperatures above 250° F. in a stream flowing through an indirect heat exchanger and of causing the scale-forming salts in said water which separate out to deposit primarily in the form of a readily removable, soft, non-adherent layer which comprises forcing said water under superatmospheric pressure into and through a multi-stage tube heat exchanger, passing the water under such pressure through the tubes of the first stage of the exchanger, heating the water in said first stage to a temperature at which scale-forming salts in the water form a deposit composed substantially only of a soft, non-adherent layer by applying heat to the water from the heat exchange surfaces at a temperature below that at which the scale-forming salts present in the water of the specific salinity treated will form a hard, adherent scale during the period the water is present in said stage, thereafter heating the thus altered hot water in the second stage under such pressure to a higher temperature above that at which the calcium sulfate will precipitate out in time by applying heat to the water from the heat exchanger surfaces at temperatures below that at which the calcium sulfate present in the altered hot water being heated will form a hard, adherent scale during the period the water is present in said stage, removing the water from the said stage before the said precipitation has occurred and periodically flushing the soft sludge from the heating surfaces by forcing a fluid rapidly over the surfaces on which the sludge is deposited.

5. A process for heating sea water in a stream flowing through tubes in an indirect heat exchanger to a temperature above 250° F. at which calcium sulfate would in the absence of steps to prevent the same precipitate out from said water and form a hard, adherent scale in the tubes, which comprises adding sodium chloride to said sea water, dissolving the same therein, passing the sea water of increased salinity under superatmospheric pressure through the tubes, maintaining the sea water side of the tubes at a temperature below that at which excessive hard scale deposition occurs and heating the sea water while in said tubes under superatmospheric pressure to an ultimate temperature above 250° F. at which calcium sulfate would in the absence of steps to prevent the same form a hard scale but below that at which calcium sulfate present in the altered sea water forms a hard scale during the period the sea water is in the tubes, thereby causing the salts retained in the tubes to deposit substantially only in a soft non-adherent form.

6. The process defined in claim 1 wherein the heat is applied to the water from the heat exchange surfaces in each of the two stages at temperatures which are not more than 20% higher than the temperature to which the water is heated in the respective stages.

7. A process for heating sea water in a stream flowing through tubes in an indirect heat exchanger to a temperature above 250° F. at which calcium sulfate would, in the absence of steps to prevent the same, precipitate out from said water and form a hard adherent scale in the tubes which comprises, passing the sea water through the tubes under a superatmospheric pressure, maintaining the heating surfaces of the sea water side of the tubes at a temperature above the 250° F. but not more than 5% higher than the ultimate temperature to which the water is heated in said tubes whereby scale-forming salts in the sea water deposit substantially only in the form of a soft, non-adherent sludge, and heating the sea water during the time it is in said tubes under superatmospheric pressure to an ultimate temperature above 250° F. at which calcium sulfate would, in the absence of steps to prevent the same, form a hard scale but below that at which the calcium sulfate in the sea water forms a hard scale during the period the sea water is in the tubes, thereby obtaining sea water at said increased temperature without forming excessively hard scale in the tubes.

8. A process for heating sea water in a stream flowing through tubes in an indirect heat exchanger to a temperature above 250° F. up to a maximum of 330° F. at which calcium sulfate, in the absence of steps to prevent the same, precipitates out from said water and forms a hard, adherent scale in tubes, which comprises, passing the sea water through the tubes under a superatmospheric pressure, maintaining the heating surfaces of the sea water side of the tubes at a temperature above 250° F. but not at a temperature more than 20% higher than the ultimate temperature to which the water is to be heated in said tubes, whereby scale-forming salts in the sea water deposit substantially only in the form of a soft-non-adherent sludge, and heating the sea water during the time it is in said tubes under superatmospheric pressure to an ultimate temperature above 250° F. at which calcium sulfate would, in the absence of steps to prevent the same, form a hard scale but below that at which the calcium sulfate in the sea water forms a hard scale during the period the sea water is in the tubes thereby obtaining sea water at said increased temperature without forming excessively hard scale in the tubes.

9. A process for heating sea water containing calcium sulfate and other scale-forming compounds to temperatures of from 250° F. to 350° F. in a two stage indirect heat exchanger and of causing the scale-forming compounds in said water which separate out on heating to such temperature to deposit primarily in the form of a soft, non-adherent layer in the first stage, which comprises forcing said water under super-atmospheric pressure in a stream into a tube of the first stage of the two stage heat exchanger, passing the water under pressure through the said tube, heating the water while in said tube to a temperature of from 250° F. to 330° F. at which scale-forming compounds in the water deposit substantially only as a soft, non-adherent layer by applying heat to the water from the heat exchange surfaces at a temperature not greater than 20% higher than the ultimate temperature to which the water is heated in said tube, thereafter flowing the thus altered hot water into and through the second stage of the heat exchanger under the pressure, heating said water in said second stage to a higher temperature up to 350° F. but below that which causes the calcium sulfate present to precipitate out during the period the water is present in said stage by applying heat to the water from the heat exchanger surfaces maintained at temperatures not greater than 20% higher than the ultimate temperature to which the water is heated in said stage, whereby the calcium sulfate in the altered hot water being heated does not form a hard scale at a prohibitive rate during the period it is present in said stage, flowing the thus heated water from the said stage before precipitation has occurred and periodically flushing the soft layer from the tube of the first stage by forcing a fluid at a high velocity through said tube, whereby said tube is restored substantially to its initial heat transfer rate and capacity.

References Cited in the file of this patent

UNITED STATES PATENTS

| | | |
|---|---|---|
| 273,778 | Strong | Mar. 13, 1883 |
| 443,186 | Alberger | Dec. 23, 1890 |
| 599,983 | Gunning | Mar. 1, 1898 |
| 925,283 | Brazda | June 15, 1909 |
| 1,059,431 | Brazda et al. | Apr. 22, 1913 |
| 1,553,067 | Burnette | Sept. 8, 1925 |
| 1,613,701 | Hall | Jan. 11, 1927 |
| 1,927,555 | Oetken | Sept. 19, 1933 |
| 2,342,201 | Kain | Feb. 22, 1944 |
| 2,394,643 | Switzer | Feb. 12, 1946 |
| 2,395,260 | Farmer et al. | Feb. 19, 1946 |
| 2,520,186 | Von Platen | Aug. 29, 1950 |

OTHER REFERENCES

Bulletin of the Virginia Polytechnic Institute, Bulletin No. 23, July 1930, pages 14–21.